United States Patent
Groschup et al.

(10) Patent No.: US 6,944,354 B2
(45) Date of Patent: Sep. 13, 2005

(54) REFLECTED OR TRANSMITTED LIGHT SCANNER AND IMAGE PROCESSING METHOD FOR SCANNED-IN IMAGE SAMPLES

(75) Inventors: Thomas Groschup, Rosenheim (DE); Thomas Schuhrke, Munich (DE)

(73) Assignee: Agfa-Gevaert Aktiengesellschaft, Leverkusen (DE)

( * ) Notice: Subject to any disclaimer, the term of this patent is extended or adjusted under 35 U.S.C. 154(b) by 748 days.

(21) Appl. No.: 09/920,252

(22) Filed: Aug. 1, 2001

(65) Prior Publication Data

US 2002/0024596 A1 Feb. 28, 2002

(30) Foreign Application Priority Data

Aug. 25, 2000 (DE) .......................................... 100 41 750

(51) Int. Cl.[7] .................................................. G06K 9/40
(52) U.S. Cl. ........................ 382/275; 382/312; 382/264
(58) Field of Search ................................ 382/162, 164, 382/167, 254, 264, 274, 275, 312, 318

(56) References Cited

U.S. PATENT DOCUMENTS

| | | |
|---|---|---|
| 4,680,638 A | 7/1987 | Childs |
| 5,266,805 A | 11/1993 | Edgar |
| 6,222,578 B1 * | 4/2001 | Tanibata .................... 347/236 |
| 6,512,238 B1 * | 1/2003 | Iwaki ...................... 250/559.4 |
| 6,552,778 B1 * | 4/2003 | Konagaya .................... 355/71 |
| 6,700,685 B1 * | 3/2004 | Matama ...................... 358/487 |

FOREIGN PATENT DOCUMENTS

| | | |
|---|---|---|
| DE | 3636077 | 10/1986 |
| DE | 4238395 | 5/1993 |
| DE | 10029826 | 8/2001 |
| JP | 10294870 | 4/1998 |

* cited by examiner

*Primary Examiner*—Kanjibhai Patel
(74) *Attorney, Agent, or Firm*—Milde & Hoffberg, LLP

(57) ABSTRACT

A reflected or transmitted light scanner includes an illumination device for illuminating image material, a carrier for holding the image material, and a recording device for recording the light transmitted through the image material and for pixel by pixel conversion of the light into electric signals that can be used to generate original image signals in several colors as well as a defect signal. The reflected or transmitted light scanner further comprises a memory device for storing the image and defect signals, pixel by pixel; a computing device for generating low-pass signals from the image signals; a memory device for storing the low-pass signals, pixel by pixel; and a correction device for selecting between the image signal and the low-pass signal, or a combination of image signal and low-pass signal, for each pixel, in dependence upon the value or the position of the defect signal for the respective pixel.

25 Claims, 3 Drawing Sheets

REFLECTED OR TRANSMITTED LIGHT SCANNER AND IMAGE PROCESSING METHOD FOR SCANNED-IN IMAGE SAMPLES

BACKGROUND OF THE INVENTION

The invention relates to a reflected or transmitted light scanner and an image processing method for scanned-in image samples.

When scanning image samples, the scanned images often exhibit defects that may have various causes. A potential cause for the defective areas may be image light dispersed on scratches of the sample. Other potential causes are dust or other particles present on the sample or on the image recording device, or errors in the imaging optics or the recording device.

Several methods have already been recommended to correct these types of defects in the image.

U.S. Pat. No. 4,680,638 describes a method that uses an infrared scan for correcting defects for a video film. The defect that is detected using the infrared scan is corrected either by replacing the image information with information of a previous image of the film, or through interpolation of the defective area. However, replacing the defective image area with information from the previous image is only practical for video films, where essentially the same image is recorded multiple times. The interpolation method is also suitable for individual image scanners, however its computing time is time-consuming because each individual defective pixel needs to be considered together with its adjacent pixels.

U.S. Pat. No. 5,266,805 also describes a method for correcting defects that is based on taking an infrared signal in addition to the red, green and blue signals. The infrared signal provides information regarding the position and magnitude of the defects. This method recommends correcting minor defects—that is, defects with an infrared signal that is below a certain threshold—by dividing the image signal by the infrared signal. Stronger defects where it is no longer possible to detect color information are eliminated by interpolation. With this correction method, the computing of the interpolation is very time-consuming as well, thus preventing quick processing of the scanned-in images.

The German Patent application No. DE 100 29 826 5, recommends recording in a different spectral range in place of the infrared scan in addition to the three color scans of the image sample. This additional defect scan is then computed together with the image signals in the three colors in order to eliminate the defects. This method is very computing time intensive as well and is additionally dependent on the film type.

Computing intensive image processing methods are not practicable due to today's demands to generate as many images as possible in a short time and at an excellent quality. This is especially so in large-scale photo labs and also when using simple flatbed scanners.

SUMMARY OF THE INVENTION

Thus, it is the principal objective of the present invention to design a reflected or transmitted light scanner and an image processing method such that very fast defect correction can be ensured with a consistent image quality with small expenditures in resources.

This objective, as well as other objectives which will become apparent from the discussion that follows, are achieved, in accordance with the invention, by a reflected and transmitted light scanner which includes an illumination device for illuminating image material, a carrier for holding the image material, and a recording device for recording the light transmitted through the image material and for pixel by pixel conversion of the light into electric signals that can be used to generate original image signals in several colors as well as a defect signal. The reflected or transmitted light scanner further comprises a memory device for storing the image and defect signals, pixel by pixel; a computing device for generating low-pass signals from the image signals; a memory device for storing the low-pass signals, pixel by pixel; and a correction device for selecting between the image signal and the low-pass signal, or a combination of image signal and low-pass signal, for each pixel, in dependence upon the value or the position of the defect signal for the respective pixel.

As used herein the term "original image signals" is intended to mean not defect corrected image signals"; that is, signals bearing scanned raw image data.

According to the invention, pixels that are detected in the scanned-in image as being defective are replaced by the low-pass signal of the image signal or by a combination of image signal and low pass signal. A defect that stems, for example, from a scratch or from dust on the image sample appears typically as a local narrow density variation on the scanned-in image. Thus, it is typically a locally very limited but intensive density fluctuation. Such a density fluctuation is essentially eliminated when filtering the image signal through a low-pass, because as detail information it is basically reproduced in the high-frequency portion of the image signal. Thus, the low-pass signal contains the image signal that has been smoothed across the defect. As soon as the pixel has been recognized as defective due to the value of the defect signal, the image signal can be replaced by the low-pass signal.

It often makes sense to replace the defective image signal—particularly in the transition area of defect and image—through a combination of image and low-pass signals since this can ensure a smoother transition between adjacent non-defective pixels whose image signals are retained and defective pixels whose image signals are replaced. The progression of employing a pure low-pass signal, a combination of image and low pass signal and an image signal across the defect may be specified by a function a derived from the position, and potentially the magnitude of the defect.

A reflected or transmitted light scanner according to the invention includes illumination devices for illuminating the samples, sample holders as well as recording devices for recording the reproduced samples and for converting the recorded image signals into electrical signals. Such a scanner enables recording of image signals in several colors—preferably in red, green and blue—as well as recording of a defect signal. However, it may also be a black/white scanner that records only one image and one defect signal. In a computing device, the recorded image signals pass through a low-pass filter, and the image signals, low-pass signals as well as the defect signals are stored such that they can be processed pixel by pixel. A defect template is formed based on the value of the defect signal. Using a correction device, either the image signal of this pixel, the low-pass-filtered image signal or a combination of image and low-pass signal is assigned to each pixel depending on the value of the defect template of this pixel. Not storing the low-pass signals can accelerate the process. This is easily possible since the signals can be processed in a parallel and flowing manner, in particular in the case of a purely hardware implementation.

In an advantageous embodiment of the reflected and transmitted light scanner, the illumination device includes multi-color LEDs. Red, green and blue or single-color LEDs are provided for recording the image signals. LEDs in an additional visible spectral range or in infrared can be provided for recording the defect signal. The LEDs can be distributed evenly across the light source, or several partial light sources can be combined to one light source by using a beam combiner. A particular advantage of using LEDs is that they can be switched vary rapidly, thus sparing the need for a mechanical shutter at the scanner.

Alternatively, the illumination device may exhibit a white light source. In this case, however, the white light must be split into its color components when used for a color scanner. For this purpose, a color filter may be provided between the illumination device and the recording device. One possibility is a filter wheel containing various color filters that are inserted at each color scan. However, this requires that the color scans are generated consecutively. It would also be possible to construct the recording device using color filters, e.g., mosaic filters. All other known filter arrangements can be used here as well.

Another possibility for color separation is to carry out the splitting of the white or multi-colored light between the image material and the recording device. Beam splitters can be used for this purpose, for example. They can direct the various color components of the light that penetrated the image material to several recording devices. In this manner it is possible to record all different color separations as well as the defect signal in one recording step.

The generation of the low-pass signal can be carried out using software or hardware. One advantageous exemplary embodiment for analog low-pass filtering includes a computing unit, which generates a low-pass signal one or two dimensionally, for example, through mean value calculation. All other known methods for generating a low-pass signal can be employed with this method as well. However, it is particularly advantageous if image signals of defective pixels are not taken into account for the low-pass generation. Image signal values of these pixels can be omitted for the low-pass generation and in their place, values of adjacent, non-defective pixels can be used.

However, it is particularly advantageous to realize the low-pass filtering by means of hardware. This approach is particularly preferred with high-performance scanners because they ensure very quick image signal processing. To generate the low-pass signal, a computing unit is used that preferably implements a two dimensional low-pass. Various popular low-pass generation methods are possible here as well; it is furthermore possible to use only a one-dimensional low-pass. Here again it is particularly advantageous if image signals from pixels that have been detected to be defective are not used for low-pass filtering.

In a particularly advantageous embodiment, signal processing is carried out such that the image signal, low pass signal and defect signal are processed simultaneously. While a low-pass signal is generated from the image signal, the image signal can be transmitted in a delayed manner and the defect signal can be prepared such that the defective pixels, original pixels that are to be retained, and possibly transition pixels are available in the transition area between the defect and the non-defective original image are available at the same time (that is, in the same instant). The transition area is created to avoid jumps between the pixels that are replaced by the low-pass signal and original pixels. It is particularly advantageous to employ a combination of image signals and low-pass signals in this transition area. In the end, processing of image, low-pass and defect signals is ensured in that, for example, a mixer is provided for selecting between image, low-pass and/or a combination of image and low-pass signals, where the mixer assigns to the respective pixel one or two potential signal values or a combination thereof, depending on the defect value of this pixel.

In an image processing method according to the invention, image signals of a transparent image material are recorded using a recording element, for example, a CCD. In addition, a defect signal is recorded or derived from the already recorded image signals. This reflects the defects of the image material as well as those of the recording device or of the entire recording optics. It is used to recognize the position of defects in the recorded image signal. Low-pass signals of the image signals are generated by filtering. These low-pass signals or a combination of image and low-pass signal are used at those locations of the image where the position of a defect has been determined based on a defect signal.

Since the uniformity of the illumination of the recording device can vary significantly when illuminated with light of different spectral ranges, and in particular the behavior of different recording devices that are each used to separately record the light of different spectral ranges, it is advantageous to perform an illumination correction. This can be carried out based on a so-called "hot light" recording. For this purpose, the recording device is illuminated in the beam path without the image sample and the recorded signal is used as a reference value.

An additional advantageous possibility of an illumination correction—especially when there is an image sample in the beam path—is made possible by the defect signal. The low-pass signal of the defect signal, or the defect signal itself, reflects the progression of the illumination of the recording device and can, therefore, be used for the correction of the illumination.

The defect signal can be generated using various methods. It is possible to record the defect signal directly, for example, through an infrared scan that is recorded in addition to the color scans. The defect signal can be derived through the recording of light scattered by the image material or through the recording of an additional color scan that can be computed together with other color scans.

A very favorable solution, with regard to cost and constructive effort, for recording image signals and the defect signal is to use the same recording device for all signals and to generate the recording successively where the different scanned spectral ranges can be tested.

To record as many pictures as quickly as possible, it is advantageous to record image signals and defect signals with different recording devices. Different CCDs can be provided for each signal where the signals are separated by beam splitters corresponding to their spectral range. It is particularly important to perform an illumination correction for all signals, especially when different recording devices are used for the various signals. However, this correction may also be important when one and the same recording device is used but the optics or color filters exhibit wavelength-dependent properties that falsify the signals.

According to an advantageous exemplary embodiment, the correction of a pixel that has been detected as being defective is carried out such that a threshold value for the defect signal is taken into account, to select whether the image signal of a pixel, its low-pass signal or a combination of image and low-pass signal shall be used. As soon as the defect signal exceeds this threshold value, the image signal is no longer used for the pixel; instead, the low-pass signal or a combination of image and low-pass signal is used. It is particularly advantageous to use a combination of image and low-pass signals for image points in the transition area between defective and non-defective pixels. This avoids an abrupt transition between the low-pass signal and the image signal that could lead to unsightly jumps in the density. Alternatively, this effect can be achieved when a corrected image signal is used for pixels, where the value of the defect signal is below the threshold value, while a low-pass signal is used for pixels, whose defect signal value exceeds the threshold value, and where subsequently the transition area between the selected low-pass and image signal is smoothed using an additional low-pass.

This method can also be used for line scanners. However, if a two-dimensional low-pass signal is to be formed, the scanned-in signal must always be stored across several lines. Yet, it is also possible to always store only the image signal of one line in each color as well as its defect signal, to form the low-pass signal across the line and to apply it at positions that have been recognized as defective.

As has already been mentioned, for this method, the low-pass signal can be generated by various means.

For a full understanding of the present invention, reference should now be made to the following detailed description of the preferred embodiments of the invention as illustrated in the accompanying drawings.

DETAILED DESCRIPTION OF THE PREFERRED EMBODIMENTS

The preferred embodiments of the present invention will now be described with reference to FIGS. 1–3 of the drawings.

Figure 1:
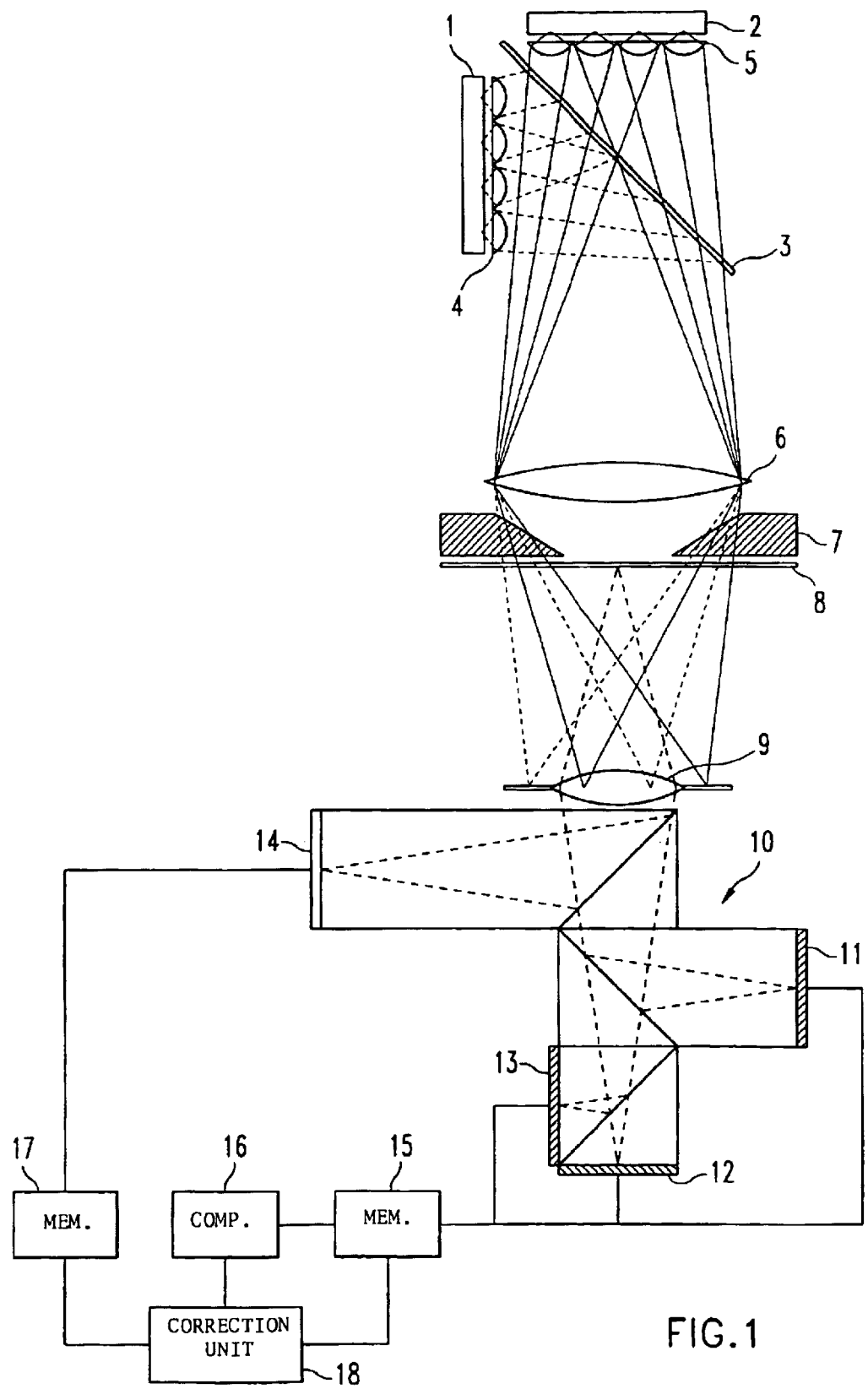
FIG. 1 is a schematic representation of an exemplary embodiment of a transmitted light scanner according to the invention.

FIG. 1 schematically presents the design of an exemplary embodiment of a transmitted light scanner according to the invention. Two multi-colored LED arrays 1 and 2, whose light paths are combined using a beam splitter 3, are used as illumination devices. For example, LED array 1 is made up of red and green LEDs, whose light is focused using a lens array 4 arranged in series. LED array 2, on the other hand, includes infrared and blue LEDs whose light is focused as well, using a lens array 5 arranged in series, and then guided to the beam splitter 3. The multi-colored light that is combined at the dichroic beam splitter 3 is guided through the mask of the film stage 7 to the image sample 8 using a condenser lens 6. The multi-colored light penetrating the film stage 7 is focused by a reproducing lens 9 onto a beam splitter prism complex 10, from where it is redirected onto various CCD arrays. It is apportioned to the respective CCD arrays corresponding to the respective spectral components such that the red color component is reproduced on the CCD array 11, for example, the green color component on the CCD array 12, the blue color component on the CCD array 13, and finally the infrared spectral component on the CCD array 14, for example. At the respective CCD arrays 11, 12 and 13, the color components are then converted to image signals, and at CCD array 14, the color signal is converted to a defect signal. The original image signals are stored in a memory device 15. Low-pass signals are obtained from the color signals at a computing unit 16. The defect signal is at the same time compared to a threshold value in an additional computing unit with a connected memory unit 17, and the defect signals that exceed the threshold value are stored or processed directly. The image, low-pass and defect signals present in the memory or computing units 15, 16 and 17 are combined in a correction device 18. In doing so, either the image signal of the pixel or the low-pass signal of the pixel or a combination of image and low-pass signal is assigned to each pixel corresponding to the value of the defect signal of this pixel. In this manner, an image signal of the original is allocated to pixels that stem from areas of the picture that are not defective, while low-pass signals replace defective areas.

Figure 2:
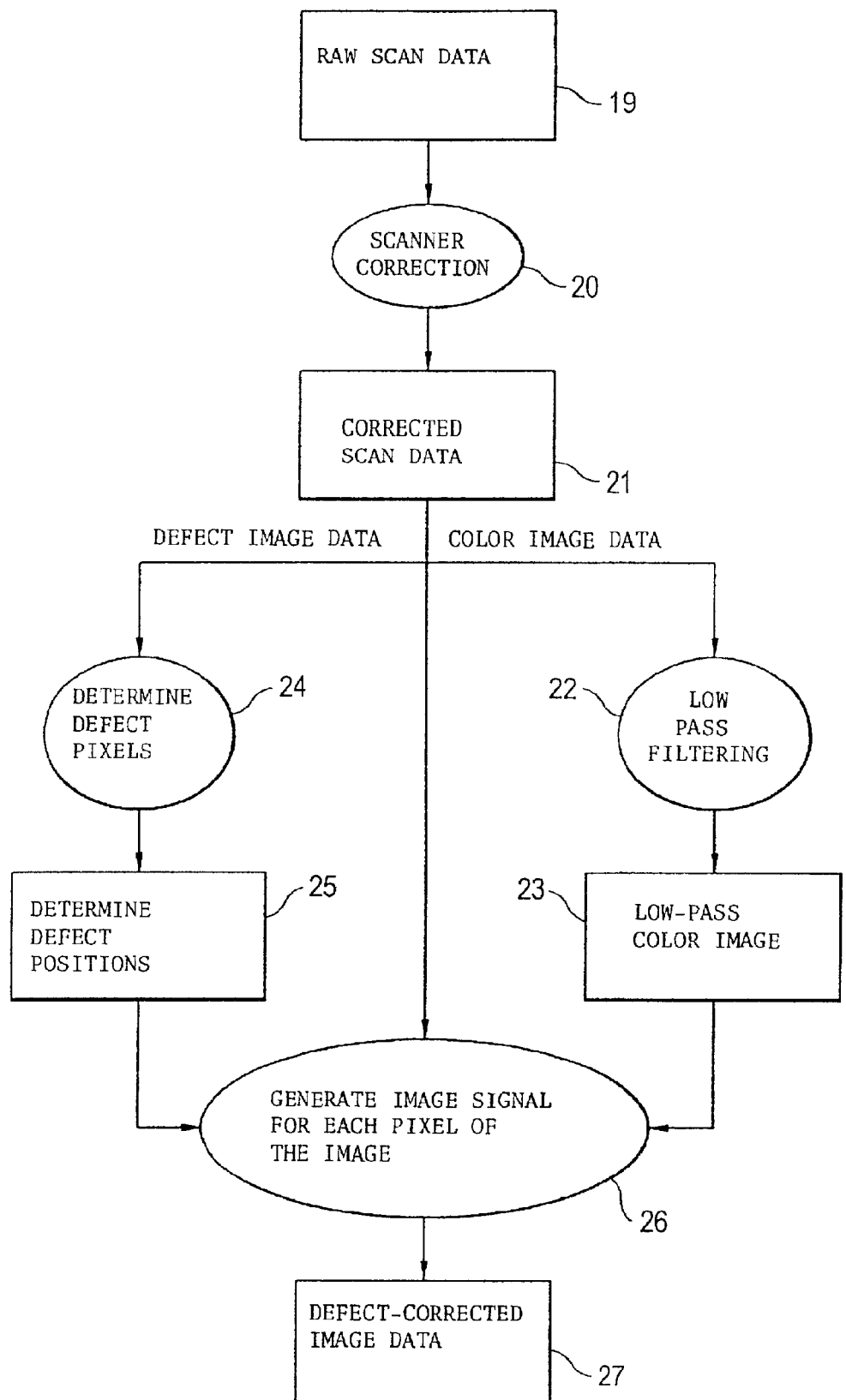
FIG. 2 is a flow chart for carrying out the method according to the invention.
Figure 3:
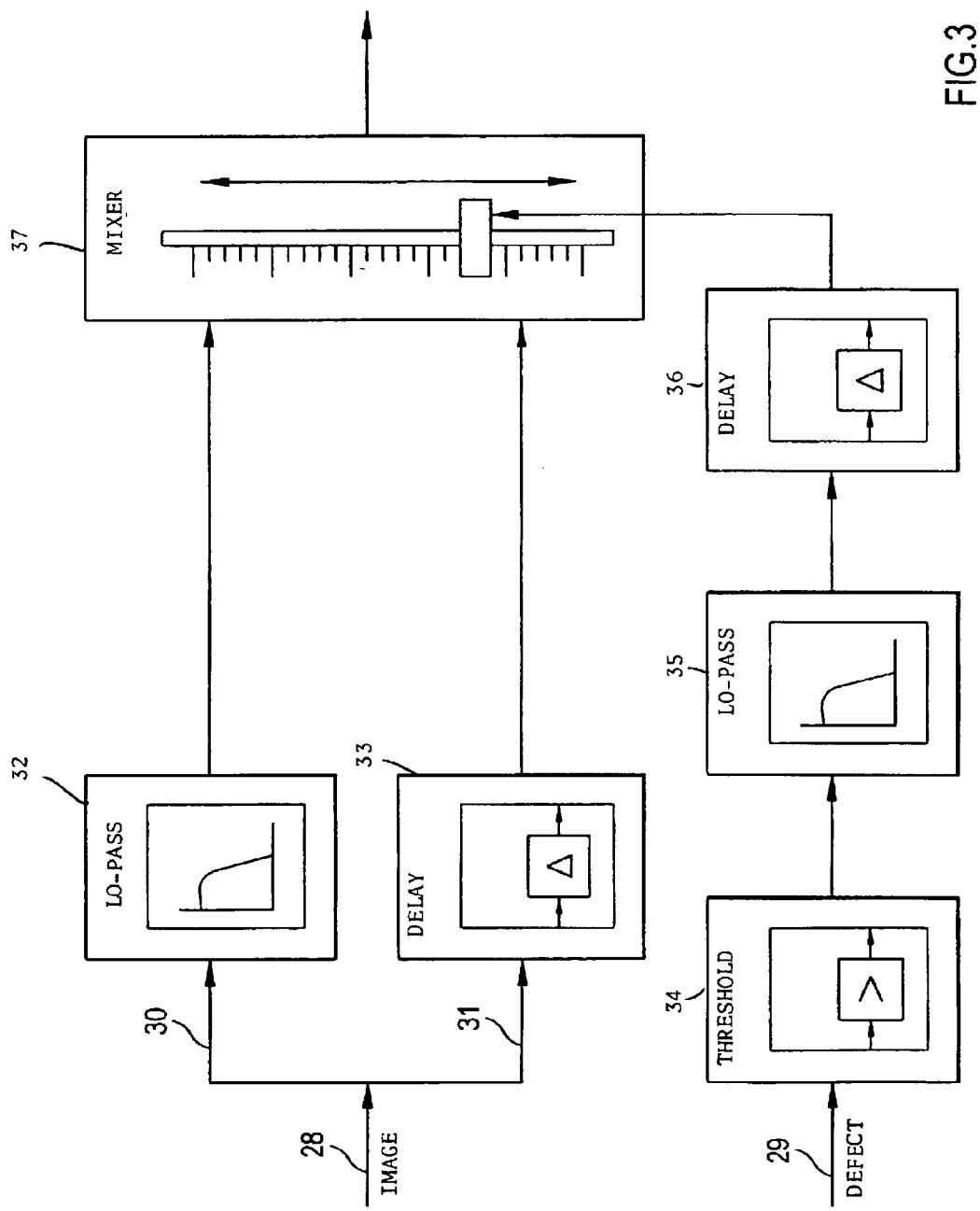
FIG. 3 is a block diagram of a hardware implementation of the defect correction method according to the invention.

The sequence of this correction process is explained in greater detail in FIG. 2 using a flow chart. The raw scan data present in step 19 represent the signals resulting from the color channels red, green and blue and from the defect channel. Before being further processed, these signals undergo a scanner correction 20, where, for example, illumination corrections, distortion corrections or corrections of other associated errors are carried out. The result in step 21, after the correction, is corrected data in red, green, and blue and in a defect channel in infrared, for example. This data is now provided to different processing steps. In step 22, the color channel data undergoes low-pass filtering, resulting in a low-pass image in red, green and blue in step 23. In step 24, the defect pixels are determined based on the scanner-corrected defect image. The defect pixels are determined by the comparison of the defect values with a threshold value. The threshold value is set higher or lower depending on whether only stronger defects are to be corrected or smaller ones as well. If both large and small defects are to be corrected, the threshold value can be set close to the mean defect signal at a non-defective location (in the ideal case, towards zero). However, it is desirable in such a case that the illumination correction is implemented as optimally as possible. The positions of the defects in the scanned-in image result from the determination of the defect pixels in step 25. Finally, a corrected image signal pixel is assigned to each pixel of the image data in a correction step 26. Outside the defect position present in step 25, said corrected image signal pixel is set equal to the corrected image data present in step 21. Either the low-pass signal generated in step 23 or a combination of this low-pass signal and the color signal determined in step 21 is assigned to the corrected image value at the defect position determined in step 25. After this step has been carried out for all pixels of the image, the defect-corrected image data for red, green and blue for the entire scan of the image sample is available in step 27. A linear combination of low-pass and color signal, for example, can be used in step 26 as the combination of low-pass signal and color signal. It is advantageous to carry out the weighting of the respective components to be added according to their position relative to the defect, such that predominantly the low-pass component is used in the center of the defect, while low-pass signal and color signal enter with about equal weight in the transition area between defective and non-defective pixels, and finally only the color signal is used for not defective pixels. To this end, a factor α that is dependent on the scratch positions can be created. It can also take the magnitude and width of the defect into account. Using such a procedure, a flowing transition between corrected defect and original image can be ensured.

The image signal values of a corrected pixel are then the result of, for example, a linear combination of the weighted image signals and the weighted low-pass signals of these image signals as:

$$(R, G, B)_{cor} = (1-\alpha)*(R, G, B) + \alpha*TP(R, G, B)$$

This defect correction method, shown in the flow chart of FIG. 2, can be realized particularly advantageously using a hardware implementation.

An advantageous hardware implementation of the defect correction method according to the invention is described in connection with FIG. 3. To ensure particularly quick processing, the image signals are processed in a first signal path 28 and the defect signals in a second, parallel signal path 29. The image signals in turn undergo a two dimensional low-pass generation in parallel via signal paths 30 and 31, in process block 32, while the same image signals are delayed by the computing time required for the low-pass generation in a second signal path 31 in a block 33. Thus, the result after processing blocks 32 and 33 are a blurred image signal in signal path 30 and a delayed original image signal in signal path 31. In signal path 29, the defect signal is compared to a threshold value in a processing block 34, such that a signal characteristic for the defect position will be available after the threshold comparison. This selected defect signal is preferably low-pass-filtered in a processing block 35 effectively widening the detected defects. This widening serves the purpose of creating the previously mentioned transition area between the defect image that has been corrected using the low-pass and the original image. In a delay block 36, the widened defect image is now coordinated, with regard to time, with the processed image signal such that the blurred image signal, the original image signal and the defect signal of a pixel are at the same clock pulse. Now, these three values are processed together in a mixer 37 where they are proportionally added. The components of the image signal and of the low-pass signal of a pixel are determined based on the value of the defect signal of a pixel and their output as the corrected image signal of this pixel.

The two dimensional low-pass generation in blocks 32, or 35, respectively, can each occur in a computing unit by means of hardware. In this manner, the entire defect correction method can be realized using hardware. All image signal processing steps can be carried out in parallel, and only one pixel at a time needs to be processed without the need to correlate it to adjacent pixels. This allows for optimal and quick processing of the image.

Of course, the hardware implementation presented here is only one possibility of the image processing. It is just as possible, for example, to forgo the widening of the defect in step 35 and to carry out a low-pass filtering of the transition area between the defective pixels and the non-defective pixels after the correction of the image signals. It is furthermore possible, to employ only the low-pass signal at the position of the pixels that have been determined to be defective and the pure image signal without mixing at the position of the pixels that have been determined to be non-defective.

There has thus been shown and described a novel reflected or transmitted light scanner and an image processing method which fulfill all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A reflected or transmitted light scanner comprising, in combination:
    (a) an illumination device for illuminating image material;
    (b) a carrier for holding the image material;
    (c) a recording device for recording the light reflected by or transmitted through the image material and for pixel by pixel conversion of the light into original image signals in several colors and a defect signal;
    (d) a memory device for storing the image and defect signals pixel by pixel;
    (e) a computing device for generating low-pass signals from the image signals;
    (f) a correction device for selecting between the image signals and the low-pass signal or a combination of image signals and low-pass signal of each pixel depending upon the value of the defect signal of the respective pixel.

2. Reflected or transmitted light scanner as set forth in claim 1 wherein the illumination device comprises single color LEDs.

3. Reflected or transmitted light scanner as set forth in claim 1, wherein the illumination device comprises multicolor LED's.

4. Reflected or transmitted light scanner as set forth in claim 1, wherein the illumination device includes a white light source.

5. Reflected or transmitted light scanner as set forth in claim 3, further comprising color filter interposed between the illumination device and the recording device.

6. Reflected or transmitted light scanner as set forth in claim 2, further comprising at least one beam splitter interposed between the image material and the recording device.

7. Reflected or transmitted light scanner as set forth in claim 1, comprising a plurality of recording devices.

8. Reflected or transmitted light scanner as set forth in claim 1, wherein parallel signal paths are provided for the image signal, the low-pass signal and the defect signal.

9. Reflected or transmitted light scanner as set forth in claim 8, further comprising a mixer for selecting between the image signal, the low-pass signal and a combination of image and low-pass signal.

10. An image processing method comprising the steps of:
    (a) recording original image signals representing an image from an image material;
    (b) producing a defect signal representing defects of the image material and recording device;
    (c) generating low-pass signals of the image signals;
    (d) correcting the image signals, pixel by pixel, by selecting between image signals, low-pass signals or a combination of image signals and low-pass signals, in dependence upon the defect signal as a selection criterion.

11. Image processing method as set forth in claim 10, further comprising the step of carrying out an illumination correction of the recorded signals.

12. Image processing method as set forth in claim 11, wherein the illumination correction is carried out through reconciliation with a hot light recording.

13. Image processing method as set forth in claim 11, wherein the illumination correction is carried out based on a further low-pass signal of the defect signal.

14. Image processing method as set forth in claim 10, wherein the defect signal is generated through recording an additional image signal and computing these image signals together with the other image signals.

15. Image processing method as set forth in claim 10, wherein the defect signal is generated through recording of the infrared light.

16. Image processing method as set forth in claim 10, wherein the image signals and the defect signals are recorded with the same recording device.

17. Image processing method as set forth in claim 10, wherein the image signals and the defect signals are recorded with different recording devices.

18. Image processing method as set forth in claim 17, wherein the image signals and the defect signals are corrected with regard to different properties of the recording devices.

19. Image processing method as set forth in claim 10, wherein a threshold value for the defect signal is taken into account during the selection.

20. Image processing method as set forth in claim 19, wherein the low-pass signal or a combination of the image signal and the low-pass signal is employed for pixels, where the value of the defect signal exceeds the threshold value.

21. Image processing method as set forth in claim 20, wherein a corrected image signal is employed for pixels, where the value of the defect signal is below the threshold value.

22. Image processing method as set forth in claim 10, wherein an additional low-pass signal is used for locations in the transition area between selected low-pass signals and the image signal.

23. Image processing method as set forth in claim 10, wherein the low-pass signal is generated through sliding mean value formation.

24. Image processing method as set forth in claim 10, characterized in that low-pass signals are generated two-dimensionally.

25. Image processing method as set forth in claim 10, wherein image signals of pixels whose defect signal value exceeds a threshold value are skipped during the generation of the low-pass signals.

* * * * *